(12) United States Patent
Cao et al.

(10) Patent No.: US 10,287,206 B2
(45) Date of Patent: May 14, 2019

(54) BORON-FREE GLASS FIBER COMPOSITION, GLASS FIBER PREPARED FROM THE SAME, AND COMPOSITE MATERIAL COMPRISING THE GLASS FIBER

(71) Applicant: JUSHI GROUP CO., LTD., Tongxiang (CN)

(72) Inventors: Guorong Cao, Tongxiang (CN); Lin Zhang, Tongxiang (CN); Wenzhong Xing, Tongxiang (CN); Guijiang Gu, Tongxiang (CN)

(73) Assignee: JUSHI GROUP CO., LTD., Tongxiang (CN)

( * ) Notice: Subject to any disclaimer, the term of this patent is extended or adjusted under 35 U.S.C. 154(b) by 0 days.

(21) Appl. No.: 15/851,759

(22) Filed: Dec. 22, 2017

(65) Prior Publication Data

US 2018/0118611 A1 May 3, 2018

Related U.S. Application Data

(63) Continuation-in-part of application No. PCT/CN2015/094387, filed on Nov. 12, 2015.

(30) Foreign Application Priority Data

Oct. 15, 2015 (CN) .......................... 2015 1 0664578

(51) Int. Cl.
*C03C 13/00* (2006.01)
*C03C 3/087* (2006.01)

(52) U.S. Cl.
CPC .............. *C03C 13/00* (2013.01); *C03C 3/087* (2013.01)

(58) Field of Classification Search
CPC ....... C03C 13/00; C03C 3/087; C03C 13/046; C03C 13/06
See application file for complete search history.

(56) References Cited

U.S. PATENT DOCUMENTS

| | | | |
|---|---|---|---|
| 2009/0286440 A1 | 11/2009 | Lecomte et al. | |
| 2013/0203583 A1* | 8/2013 | Zhang ..................... | C03C 13/00 501/38 |
| 2013/0244858 A1* | 9/2013 | Li .......................... | C03C 3/087 501/35 |
| 2015/0057143 A1 | 2/2015 | Li | |
| 2017/0283309 A1* | 10/2017 | Cao ......................... | C03C 3/087 |

FOREIGN PATENT DOCUMENTS

| | | |
|---|---|---|
| CN | 101838110 A | 9/2010 |
| CN | 104743888 A | 7/2015 |
| JP | S56134534 A | 10/1981 |
| JP | S61158844 A | 7/1986 |
| JP | 2008524100 A | 7/2008 |
| JP | 2012531373 A | 12/2012 |

OTHER PUBLICATIONS

The World Intellectual Property Organization (WIPO) International Search Report for PCT/CN2015/094387 dated Jul. 12, 2016 2 Pages.
Written opinion dated Dec. 7, 2016 for PCT/CN2015/094387.

* cited by examiner

*Primary Examiner* — Elizabeth A. Bolden
(74) *Attorney, Agent, or Firm* — Anova Law Group, PLLC

(57) ABSTRACT

A composition of matter, including the following components expressed as percentage by weight: $SiO_2$, 58-60.4%; $Al_2O_3$, 14-16.5%; CaO, 14.1-16.5%; MgO, 6-8.2%; $Li_2O$, 0.01-0.4%; $Na_2O+K_2O$, less than 1.15%; $K_2O$, greater than 0.5%; $TiO_2$, less than 1.5%; and $Fe_2O_3$, less than 1%. The range of the weight percentage ratio CaO/MgO is greater than 2 and less than or equal to 2.4. A glass fiber prepared from the composition is also provided.

18 Claims, No Drawings

BORON-FREE GLASS FIBER COMPOSITION, GLASS FIBER PREPARED FROM THE SAME, AND COMPOSITE MATERIAL COMPRISING THE GLASS FIBER

CROSS-REFERENCE TO RELATED APPLICATIONS

This application is a continuation-in-part of International Patent Application No. PCT/CN2015/094387 with an international filing date of Nov. 12, 2015, designating the United States, and further claims foreign priority benefits to Chinese Patent Application No. 201510664578.1 filed Oct. 15, 2015. The contents of all of the aforementioned applications, including any intervening amendments thereto, are incorporated herein by reference.

BACKGROUND OF THE INVENTION

Field of the Invention

This disclosure relates to a boron-free glass fiber composition, a glass fiber prepared from the same, and composite material comprising the glass fiber.

Description of the Related Art

Original high-performance glass compositions were based on an $MgO$—$Al_2O_3$—$SiO_2$ system. A typical example thereof is S-2 glass developed by Owens Corning. However, the production of S-2 glass is excessively difficult, as its forming temperature is about 1571° C. and its liquidus temperature is about 1470° C. Therefore, it is difficult to realize large-scale industrial production.

To decrease the melting temperature and forming temperature and to better satisfy the needs of large-scale tank furnace production, high-performance glasses based on an $MgO$—$CaO$—$Al_2O_3$—$SiO_2$ system were successively developed. Typical examples are R glass developed by Saint-Gobain and HiPer-tex glass developed by OC. Commercial scale production was achieved by sacrificing some glass properties. However, as these solutions were conservative, and especially since the content of $Al_2O_3$ was kept at more than 20%, and preferably 25%, the production of the glass remained difficult. Although small-scale tank furnace production was achieved, the production efficiency was low, and the cost-performance ratio was not high. In addition, the ratio of Ca/Mg in the traditional R glass is too low, which causes fiberizing difficulty, high risk of crystallization, high surface tension and fining difficulty of molten glass. Moreover, the forming temperature is can reach about 1410° C. and the liquidus temperature can reach 1330° C. All these problems have caused difficulty in attenuating glass fiber and consequently in realizing large-scale industrial production.

PPG Industries has disclosed another type of R glass fiber. Its mechanical performance is slightly lower than that of the traditional R glass fiber, but the melting and forming performance are significantly superior to those of the traditional R glass. However, this type of R glass has a high risk of devitrification because the ratios of Si/Ca and Ca/Mg are not reasonable. Meanwhile, since too much $Li_2O$ is introduced, not only the chemical stability of the glass is affected, but also its raw material cost is significantly higher. Therefore, this type of glass fiber is also not suitable for large-scale industrial production.

The high-strength 2# glass fiber mainly comprises $SiO_2$, $Al_2O_3$ and MgO, and certain amounts of $Li_2O$, $B_2O_3$, $CeO_2$ and $Fe_2O_3$ are also introduced. It also has high strength and high modulus and its forming temperature is only about 1245° C. and its liquidus temperature is 1320° C. Both temperatures are much lower than those of S glass fiber. However, since the forming temperature is lower than the liquidus temperature, the control of glass fiber attenuation is unfavorable. Therefore, the forming temperature has to be increased and specially-shaped tips of bushing have to be used to prevent crystallization from occurring during the fiber drawing process. This causes difficulty in temperature control and makes it difficult to realize large-scale industrial production.

In summary, conventional high-performance glass fibers face production problems such as high liquidus temperature, high risk of devitrification, high forming temperature, high surface tension and fining difficulty of molten glass. The liquidus temperature of the mainstream E-glass is generally less than 1200° C., and its forming temperature is lower than 1300° C., while the above-mentioned high-performance glass fibers generally have liquidus temperatures higher than 1300° C. and forming temperatures higher than 1350° C. This causes glass crystallization phenomenon to occur, resulting in uneven viscosity and poor fining, which reduces the production efficiency, product quality and the service life of refractory materials and platinum bushings.

SUMMARY OF THE INVENTION

It is an objective of the present disclosure to provide a boron-free glass fiber composition that can solve the previously mentioned problems.

To achieve the above objective, in accordance with one embodiment of the invention, there is provided a glass fiber composition comprising the following components expressed as percentage by weight:

| | |
|---|---|
| $SiO_2$ | 58-60.4% |
| $Al_2O_3$ | 14-16.5% |
| CaO | 14.1-16.5% |
| MgO | 6-8.2% |
| $Li_2O$ | 0.01-0.4% |
| $Na_2O + K_2O$ | less than 1.15% |
| $K_2O$ | greater than 0.5% |
| $TiO_2$ | less than 1.5% |
| $Fe_2O_3$ | less than 1% |

In a class of this embodiment, the range of the weight percentage ratio C1=CaO/MgO is greater than 2 and less than or equal to 2.4.

In a class of this embodiment, the range of the weight percentage ratio C2=$K_2O$/$Na_2O$ is greater than 1 and less than or equal to 6.

In a class of this embodiment, the preferred range of the weight percentage ratio C1=CaO/MgO is greater than 2 and less than or equal to 2.3.

In a class of this embodiment, the preferred range of the weight percentage ratio C2=$K_2O$/$Na_2O$ is 1.2-5.

According to another aspect of this invention, a glass fiber produced with the glass fiber composition is provided.

According to yet another aspect of this invention, a composite material incorporating the glass fiber is provided.

According to the composition of this invention, a high performance boron-free glass fiber composition is provided by introducing appropriate amounts of $K_2O$ and $Li_2O$, reasonably designing the ranges of contents of CaO, MgO, $K_2O$ and $Li_2O$ respectively, strictly controlling the ranges of the ratios of $CaO/MgO$ and $K_2O/Na_2O$, making full use of the ternary mixed alkali effect of $K_2O$, $Na_2O$ and $Li_2O$, and selectively introducing a small amount of $ZrO_2$ and $HfO_2$.

Specifically, the glass fiber composition according to the present disclosure comprises the following components expressed as percentage by weight:

| | |
|---|---|
| $SiO_2$ | 58-60.4% |
| $Al_2O_3$ | 14-16.5% |
| CaO | 14.1-16.5% |
| MgO | 6-8.2% |
| $Li_2O$ | 0.01-0.4% |
| $Na_2O + K_2O$ | less than 1.15% |
| $K_2O$ | greater than 0.5% |
| $TiO_2$ | less than 1.5% |
| $Fe_2O_3$ | less than 1% |

In a class of this embodiment the range of the weight percentage ratio $C1=CaO/MgO$ is greater than 2 and less than or equal to 2.4.

The effect and content of each component in the glass fiber composition is described as follows:

$SiO_2$ is a main oxide forming the glass network and has the effect of stabilizing all the components. In the glass fiber composition of the present disclosure, the restricted content range of $SiO_2$ is 58-60.4% by weight. In order to ensure the high mechanical properties, and meanwhile not increase the fining difficulty of glass, the content range of $SiO_2$ in the glass fiber composition of this invention is specially kept relatively low. Preferably, the $SiO_2$ content range can be 58.5-60.4% by weight.

$Al_2O_3$ is another oxide forming the glass network. When combined with $SiO_2$, it can have a substantive effect on the mechanical properties of the glass and a significant effect on preventing glass phase separation and on water resistance. The restricted content range of $Al_2O_3$ in the glass fiber composition of this invention is 14-16.5% by weight. The high mechanical properties, especially modulus, cannot be obtained if $Al_2O_3$ content is too low; $Al_2O_3$ content being too high will cause the glass viscosity to be excessively high, thereby resulting in melting and fining issues. Preferably, the $Al_2O_3$ content can be 14.5-16.5% by weight.

CaO is an important glass network modifier, it has particular effects in reducing glass viscosity at high temperature, controlling the crystallization and the hardening rate of molten glass, but the CaO content being too high will cause higher crystallization tendency of glass, thereby resulting in the crystallization of anorthite ($CaAl_2Si_2O_8$) and wollastonite ($CaSiO_3$) from the glass melt. The restricted content range of CaO in the glass fiber composition of this invention is 14.1-16.5% by weight. Preferably, the CaO content can be 14.1-16.1% by weight.

MgO has an effect similar to that of CaO, and yet the $Mg^{2+}$ has higher field strength and plays a significant role in increasing the modulus of glass. However, the MgO content being too high will increase the tendency and rate of the glass crystallization, thus causing the risk of diopside ($CaMgSi_2O_6$) crystallization, which is more violent compared with that caused by CaO. The restricted content range of MgO in the glass fiber composition of this invention is 6-8.2% by weight. Preferably, the MgO content can be 6-8% by weight.

Additionally, the crystalline phase after the crystallization of high-performance glasses based on an $MgO$—$CaO$—$Al_2O_3$—$SiO_2$ system mainly comprises diopside ($CaMgSi_2O_6$), anorthite ($CaAl_2Si_2O_8$) and wollastonite ($CaSiO_3$). In order to effectively inhibit the growth of these crystals, reduce the upper limit temperature for glass crystallization (liquidus temperature) and reduce the crystallization tendency of glass, in the glass fiber composition of the present disclosure, the weight percentage ratio $C1=CaO/MgO$ is greater than 2 and less than or equal to 2.4. By controlling the range of molar ratio of $Ca^{2+}/Mg^{2+}$ to be about 1.42-1.72, the crystal growth of anorthite could balance against that of diopside in the crystallization process of glass, which helps to reduce the two crystals crystallization rate and the crystal grain integrity, simultaneously inhibit the crystallization tendency of the two crystals and reduce liquidus temperature. This is because the above-mentioned ratio can take advantage of the high field strength of $Mg^{2+}$ while ensuring a sufficient supply of $Ca^{2+}$ ions during the crystallization of glass, and make full use of the competition between $Mg^{2+}$ and $Ca^{2+}$ ions in grabbing the anion groups in the glass. Obviously, the ratio of CaO/MgO being too low will cause too much content of $Mg^{2+}$, and aggravate the crystallization of diopside; the weight percent ratio of CaO/MgO being too high will cause too much content of $Ca^{2+}$, and aggravate the crystallization of anorthite, or even cause the wollastonite crystals to form, thus greatly affecting the competitive growth balance of crystals. Preferably, the range of the weight percentage ratio $C1=CaO/MgO$ can be greater than 2 and less than or equal to 2.3. More preferably, the range of the weight percentage ratio $C1=CaO/MgO$ can be greater than 2 and less than or equal to 2.14. The technical effects can be unexpectedly achieved as compared with those with traditional high-performance glasses. Additionally, the mechanical strength of glass is better when the content of CaO is kept relatively high due to the high bond energy of Ca—O, which also has a significant effect on the accumulation of glass structure.

Both $K_2O$ and $Na_2O$ are good fluxing agents that can reduce glass viscosity. The inventors have found that, replacing $Na_2O$ with $K_2O$ while keeping the total amount of alkali metal oxides unchanged can reduce the crystallization tendency of glass, improve the fiberizing performance, and also remarkably reduce the surface tension of molten glass and improve the fining performance; and help to improve the mechanical strength of glass. In the glass fiber composition of this invention, the restricted range of the total content of $Na_2O$ and $K_2O$ is less than 1.15% by weight, the restricted content range of $K_2O$ is greater than 0.5% by weight, and the range of the weight percentage ratio $C2=K_2O/Na_2O$ can be further restricted to be greater than 1 and less than or equal to 6. Preferably, the range of the weight percentage ratio $C2=K_2O/Na_2O$ can be 1.2-5.

$Li_2O$ can not only reduce the glass viscosity dramatically to improve melting performance, but also obviously help to improve mechanical properties, compared with $Na_2O$ and $K_2O$. In addition, a small amount of $Li_2O$ can provide considerable free oxygen, thereby promoting more aluminum ions to form tetrahedral coordination that would help strengthen the glass network and further reduce crystallization tendency of glass. But the added amount of $Li_2O$ should not be too high, as the content of $Li^+$ being too high will have a significant effect in disrupting the glass network, affect the stability of glass structure, and thus increase the crystallization tendency of glass. Therefore, in the glass fiber composition of the present disclosure, the restricted range of the content of $Li_2O$ is 0.01-0.4% by weight. The inventors have found that the technical effects remain excellent even when the content of $Li_2O$ is kept relatively low, such as greater than or equal to 0.01% and less than 0.1% by weight.

$TiO_2$ can not only reduce the glass viscosity at high temperature, but also has a certain fluxing effect. However, since titanium ions have coloring effects, which will become particularly significant especially when the $TiO_2$ content is greater than 1.5% by weight, thus affecting the appearance of fiberglass products to a certain extent. Therefore, in the glass fiber composition of this invention, the restricted range of the content of $TiO_2$ is less than 1.5% by weight.

The introduction of $Fe_2O_3$ facilitates the melting of glass and can also improve the crystallization properties of glass. However, since ferric ions and ferrous ions have coloring effects, the introduced amount should be limited. Therefore, in the glass fiber composition of the present disclosure, the restricted range of the content of $Fe_2O_3$ is less than 1% by weight.

Additionally, a small amount of $ZrO_2$ and $HfO_2$ can be selectively introduced, which can further improve mechanical properties and thermal stability of the glass. Considering $ZrO_2$ and $HfO_2$ would increase glass viscosity, the added amounts of them should not be too high. Therefore, in the glass fiber composition of the present disclosure, the restricted range of the total content of $ZrO_2$ and $HfO_2$ is 0.01-2% by weight.

In addition to aforementioned components, small amounts of impurities may be present in the glass composition according to the present disclosure, and the total weight percentage of the impurities is less than or equal to 1%.

In the glass fiber composition of the present disclosure, the beneficial effects produced by the aforementioned selected ranges of the components will be explained through the specific experimental data provided below.

The following are embodiments of preferred content ranges of the components comprised in the glass fiber composition according to the present disclosure.

Preferably, the glass fiber composition according to the present disclosure comprises the following components expressed as percentage by weight:

| | |
|---|---|
| $SiO_2$ | 58.5-60.4% |
| $Al_2O_3$ | 14.5-16.5% |
| CaO | 14.1-16.1% |
| MgO | 6-8% |
| $Li_2O$ | 0.01-0.4% |
| $Na_2O + K_2O$ | less than 1.15% |
| $K_2O$ | greater than 0.5% |
| $TiO_2$ | less than 1.5% |
| $Fe_2O_3$ | less than 1% |

In a class of this embodiment, the range of the weight percentage ratio C1=CaO/MgO is greater than 2 and less than or equal to 2.3; and the range of the weight percentage ratio C2=$K_2O$/$Na_2O$ is greater than 1 and less than or equal to 6.

Preferably, the glass fiber composition according to the present disclosure comprises the following components expressed as percentage by weight:

| | |
|---|---|
| $SiO_2$ | 58.5-60.4% |
| $Al_2O_3$ | 14.5-16.5% |
| CaO | 14.1-16.1% |
| MgO | 6-8% |
| $Li_2O$ | 0.01-0.4% |
| $Na_2O + K_2O$ | less than 1.15% |
| $K_2O$ | greater than 0.5% |
| $TiO_2$ | less than 1.5% |
| $Fe_2O_3$ | less than 1% |

In a class of this embodiment, the range of the weight percentage ratio C1=CaO/MgO is greater than 2 and less than or equal to 2.14; and the range of the weight percentage ratio C2=$K_2O$/$Na_2O$ is 1.2-5.

Preferably, the glass fiber composition according to the present disclosure comprises the following components expressed as percentage by weight:

| | |
|---|---|
| $SiO_2$ | 58.5-60.4% |
| $Al_2O_3$ | 14.5-16.5% |
| CaO | 14.1-16.1% |
| MgO | 6-8% |
| $Li_2O$ | greater than or equal to 0.01% and less than 0.1% |
| $Na_2O + K_2O$ | less than 1.15% |
| $K_2O$ | greater than 0.5% |
| $TiO_2$ | less than 1.5% |
| $Fe_2O_3$ | less than 1% |

In a class of this embodiment, the range of the weight percentage ratio C1=CaO/MgO is greater than 2 and less than or equal to 2.14; and the range of the weight percentage ratio C2=$K_2O$/$Na_2O$ is 1.2-5.

The present disclosure provides a boron-free glass fiber composition, glass fiber and composite material therefrom. The composition can not only keep the forming temperature relatively low, but also solve the problems in the production of high-performance glass fiber, such as high liquidus temperature, high crystallization rate, high surface tension, fining difficulty, and the difficulty in efficient and large-scale production. The composition can significantly reduce liquidus temperature and surface tension of molten glass, and reduce crystallization tendency of glass and the amount of bubbles under the same conditions. Meanwhile, the glass fiber made therefrom possesses favorable mechanical strength.

DETAILED DESCRIPTION OF THE EMBODIMENTS

In order to better clarify the purposes, technical solutions and advantages of the examples of the present disclosure, the technical solutions in the examples of the present disclosure are clearly and completely described below combined with the drawings in the examples. Obviously, the examples described herein are just part of the examples of the present disclosure and are not all the examples. All other exemplary embodiments obtained by one skilled in the art on the basis of the examples in the present disclosure without performing creative work shall all fall into the scope of protection of the present disclosure. What needs to be made clear is that, as long as there is no conflict, the examples and the features of examples in the present application can be arbitrarily combined with each other.

The basic concept of the present disclosure is that, the glass fiber composition comprises the following components expressed as percentage by weight: $SiO_2$ 58-60.4%, $Al_2O_3$ 14-16.5%, CaO 14.1-16.5%, MgO 6-8.2%, $Li_2O$ 0.01-0.5%, $Na_2O$+$K_2O$ less than 1.15%, $K_2O$ greater than 0.5%, $TiO_2$ less than 1.5% and $Fe_2O_3$ less than 1%, wherein the range of the weight percentage ratio C1=CaO/MgO is greater than 2 and less than or equal to 2.4. In addition, the range of the weight percentage ratio C2=$K_2O$/$Na_2O$ can be further restricted to be greater than 1 and less than or equal to 6.

The specific content values of $SiO_2$, $Al_2O_3$, CaO, MgO, $Na_2O$, $K_2O$, $Fe_2O_3$, $Li_2O$, and $TiO_2$ in the glass fiber composition of the present disclosure are selected to be used in the examples, which are compared with the properties of traditional E and R glasses and improved R glass in terms of the following six property parameters:

(1) Forming temperature, the temperature at which the glass melt has a viscosity of $10^3$ poise.

(2) Liquidus temperature, the temperature at which the crystal nucleuses begin to form when the glass melt cools off, i.e., the upper limit temperature for glass crystallization.

(3) ΔT value, which is the temperature differential between the forming temperature and the liquidus temperature and indicates the temperature range at which fiber drawing can be performed.

(4) Crystallization peak temperature, the temperature of the strongest crystallization peak in the DTA (Differential Thermal Analysis) test. Generally, the higher the temperature is, the more energy that the crystal nucleuses need to grow up, and the smaller crystallization tendency of the glass is.

(5) Filament strength, the tensile strength that a filament of glass fiber strand can withstand.

(6) Amount of bubbles, to be determined approximately in a procedure set out as follows: Use specific molds to compress the batch materials in each example into samples of same dimension, which will then be placed on the sample platform of a heating microscope. Heat the glass samples according to standard procedures up to the pre-set spatial temperature 1500° C., and then the glass sample is cooled to the ambient temperature without heat preservation. Finally, each of the glass samples is examined under a polarizing microscope to determine the amount of bubbles in the samples. The amount of bubbles is identified according to a specific amplification of the microscope.

The aforementioned six parameters and the methods of measuring them are well-known to one skilled in the art. Therefore, the aforementioned parameters can be effectively used to explain the properties of the glass fiber composition of the present disclosure.

The specific procedures for the experiments are as follows: Each component can be acquired from the appropriate raw materials; the raw materials are mixed in the appropriate proportions so that each component reaches the final expected weight percentage; the mixed batch is melted and clarified; then the molten glass is drawn out through the tips of the bushings, thereby forming the glass fiber; the glass fiber is attenuated onto the rotary collet of a winder to form cakes or packages. Of course, conventional methods can be used to deep process these glass fibers to meet the expected requirements.

The exemplary embodiments of the glass fiber composition according to the present disclosure are given below.

Example 1

| | |
|---|---|
| $SiO_2$ | 59.8% |
| $Al_2O_3$ | 15.4% |
| CaO | 15.5% |
| MgO | 7.3% |
| $Li_2O$ | 0.09% |
| $Na_2O$ | 0.33% |
| $K_2O$ | 0.49% |
| $Fe_2O_3$ | 0.42% |
| $TiO_2$ | 0.47% |

The weight percentage ratio C1=CaO/MgO is 2.13; and the weight percentage ratio C2=$K_2O/Na_2O$ is 1.49.

In Example 1, the measured values of the six parameters are respectively:

| | |
|---|---|
| Forming temperature | 1277° C. |
| Liquidus temperature | 1197° C. |
| ΔT | 80° C. |
| Crystallization peak temperature | 1026° C. |
| Filament strength | 4140 mPa |
| Amount of bubbles | 6 |

Example 2

| | |
|---|---|
| $SiO_2$ | 60.0% |
| $Al_2O_3$ | 15.2% |
| CaO | 15.4% |
| MgO | 7.2% |
| $Li_2O$ | 0.25% |
| $Na_2O$ | 0.22% |
| $K_2O$ | 0.75% |
| $Fe_2O_3$ | 0.43% |
| $TiO_2$ | 0.35% |

The weight percentage ratio C1=CaO/MgO is 2.14; and the weight percentage ratio C2=$K_2O/Na_2O$ is 3.41.

In Example 2, the measured values of the six parameters are respectively:

| | |
|---|---|
| Forming temperature | 1276° C. |
| Liquidus temperature | 1195° C. |
| ΔT | 81° C. |
| Crystallization peak temperature | 1034° C. |
| Filament strength | 4149 mPa |
| Amount of bubbles | 4 |

Example 3

| | |
|---|---|
| $SiO_2$ | 59.1% |
| $Al_2O_3$ | 15.5% |
| CaO | 15.6% |
| MgO | 7.1% |
| $Li_2O$ | 0.25% |
| $Na_2O$ | 0.21% |
| $K_2O$ | 0.85% |
| $Fe_2O_3$ | 0.41% |
| $TiO_2$ | 0.38% |
| $ZrO_2 + HfO_2$ | 0.4% |

The weight percentage ratio C1=CaO/MgO is 2.20; and the weight percentage ratio C2=$K_2O/Na_2O$ is 4.05.

In Example 3, the measured values of the six parameters are respectively:

| | |
|---|---|
| Forming temperature | 1276° C. |
| Liquidus temperature | 1196° C. |
| ΔT | 80° C. |
| Crystallization peak temperature | 1030° C. |
| Filament strength | 4143 mPa |
| Amount of bubbles | 6 |

Example 4

| | |
|---|---|
| $SiO_2$ | 58.5% |
| $Al_2O_3$ | 14% |

| | |
|---|---|
| CaO | 16.1% |
| MgO | 8% |
| Li$_2$O | 0.39% |
| Na$_2$O + K$_2$O | 1.14% |
| K$_2$O | 0.95% |
| TiO$_2$ | 1% |
| Fe$_2$O$_3$ | 0.87% |

The weight percentage ratio C1=CaO/MgO is 2.01; and the weight percentage ratio C2=K$_2$O/Na$_2$O is 5.

In Example 4, the measured values of the six parameters are respectively:

| | |
|---|---|
| Forming temperature | 1266° C. |
| Liquidus temperature | 1190° C. |
| ΔT | 76° C. |
| Crystallization peak temperature | 1042° C. |
| Filament strength | 4195 mPa |
| Amount of bubbles | 3 |

Example 5

| | |
|---|---|
| SiO$_2$ | 59% |
| Al$_2$O$_3$ | 14% |
| CaO | 16.5% |
| MgO | 8.2% |
| Li$_2$O | 0.39% |
| Na$_2$O + K$_2$O | 1.14% |
| K$_2$O | 0.95% |
| TiO$_2$ | 0.5% |
| Fe$_2$O$_3$ | 0.37% |

The weight percentage ratio C1=CaO/MgO is 2.01; and the weight percentage ratio C2=K$_2$O/Na$_2$O is 5.

In Example 5, the measured values of the six parameters are respectively:

| | |
|---|---|
| Forming temperature | 1268° C. |
| Liquidus temperature | 1192° C. |
| ΔT | 76° C. |
| Crystallization peak temperature | 1038° C. |
| Filament strength | 4123 mPa |
| Amount of bubbles | 5 |

Example 6

| | |
|---|---|
| SiO$_2$ | 58% |
| Al$_2$O$_3$ | 16.5% |
| CaO | 16.5% |
| MgO | 6.875% |
| Li$_2$O | 0.4% |
| Na$_2$O + K$_2$O | 0.725% |
| K$_2$O | 0.5% |
| TiO$_2$ | 0.5% |
| Fe$_2$O$_3$ | 0.5% |

The weight percentage ratio C1=CaO/MgO is 2.4; and the weight percentage ratio C2=K$_2$O/Na$_2$O is 2.22.

In Example 6, the measured values of the six parameters are respectively:

| | |
|---|---|
| Forming temperature | 1271° C. |
| Liquidus temperature | 1194° C. |
| ΔT | 77° C. |
| Crystallization peak temperature | 1035° C. |
| Filament strength | 4135 mPa |
| Amount of bubbles | 6 |

Example 7

| | |
|---|---|
| SiO$_2$ | 60.4% |
| Al$_2$O$_3$ | 16% |
| CaO | 14.1% |
| MgO | 7% |
| Li$_2$O | 0.21% |
| Na$_2$O + K$_2$O | 1.105% |
| K$_2$O | 0.9% |
| TiO$_2$ | 0.285% |
| Fe$_2$O$_3$ | 0.9% |

The weight percentage ratio C1=CaO/MgO is 2.01; and the weight percentage ratio C2=K$_2$O/Na$_2$O is 6.

In Example 7, the measured values of the six parameters are respectively:

| | |
|---|---|
| Forming temperature | 1275° C. |
| Liquidus temperature | 1194° C. |
| ΔT | 81° C. |
| Crystallization peak temperature | 1036° C. |
| Filament strength | 4201 mPa |
| Amount of bubbles | 4 |

Example 8

| | |
|---|---|
| SiO$_2$ | 60.3% |
| Al$_2$O$_3$ | 14.5% |
| CaO | 16.1% |
| MgO | 7% |
| Li$_2$O | 0.39% |
| Na$_2$O + K$_2$O | 1.1% |
| K$_2$O | 0.6% |
| TiO$_2$ | 1.21% |
| Fe$_2$O$_3$ | 0.4% |

The weight percentage ratio C1=CaO/MgO is 2.3; and the weight percentage ratio C2=K$_2$O/Na$_2$O is 1.2.

In Example 8, the measured values of the six parameters are respectively:

| | |
|---|---|
| Forming temperature | 1275° C. |
| Liquidus temperature | 1195° C. |
| ΔT | 80° C. |
| Crystallization peak temperature | 1035° C. |
| Filament strength | 4144 mPa |
| Amount of bubbles | 5 |

Example 9

| | |
|---|---|
| SiO$_2$ | 59.36% |
| Al$_2$O$_3$ | 14.9% |
| CaO | 14.4% |

-continued

| | |
|---|---|
| MgO | 6% |
| Li$_2$O | 0.3% |
| Na$_2$O + K$_2$O | 1.14% |
| K$_2$O | 0.6% |
| TiO$_2$ | 0.4% |
| Fe$_2$O$_3$ | 0.9% |
| ZrO$_2$ + HfO$_2$ | 2% |

The weight percentage ratio C1=CaO/MgO is 2.4; and the weight percentage ratio C2=K$_2$O/Na$_2$O is 1.11.

In Example 9, the measured values of the six parameters are respectively:

| | |
|---|---|
| Forming temperature | 1278° C. |
| Liquidus temperature | 1196° C. |
| ΔT | 82° C. |
| Crystallization peak temperature | 1031° C. |
| Filament strength | 4183 mPa |
| Amount of bubbles | 9 |

Example 10

| | |
|---|---|
| SiO$_2$ | 59.36% |
| Al$_2$O$_3$ | 16.5% |
| CaO | 14.4% |
| MgO | 6% |
| Li$_2$O | 0.3% |
| Na$_2$O + K$_2$O | 1.14% |
| K$_2$O | 0.6% |
| TiO$_2$ | 1.39% |
| Fe$_2$O$_3$ | 0.9% |
| ZrO$_2$ + HfO$_2$ | 0.01% |

The weight percentage ratio C1=CaO/MgO is 2.4; and the weight percentage ratio C2=K$_2$O/Na$_2$O is 1.11.

In Example 9, the measured values of the six parameters are respectively:

| | |
|---|---|
| Forming temperature | 1276° C. |
| Liquidus temperature | 1196° C. |
| ΔT | 80° C. |
| Crystallization peak temperature | 1030° C. |
| Filament strength | 4192 mPa |
| Amount of bubbles | 5 |

Comparisons of the property parameters of the aforementioned examples and other examples of the glass fiber composition of the present disclosure with those of the traditional E glass, traditional R glass and improved R glass are further made below by way of tables, the component contents of the glass fiber composition are expressed as weight percentage, as shown in Tables 1 and 2. What needs to be made clear is that the total amount of the components in the examples is slightly less than 100%, and it should be understood that the remaining amount is trace impurities or a small amount of components which cannot be analyzed.

TABLE 1

| | | A1 | A2 | A3 | A4 | A5 | A6 | A7 |
|---|---|---|---|---|---|---|---|---|
| Component | SiO$_2$ | 59.6 | 59.0 | 58.7 | 60.4 | 60.0 | 59.8 | 59.1 |
| | Al$_2$O$_3$ | 15.5 | 14.8 | 15.6 | 15.9 | 16.5 | 15.4 | 15.5 |
| | CaO | 15.6 | 16.5 | 16.0 | 15.2 | 14.1 | 15.5 | 15.6 |
| | MgO | 7.4 | 8.0 | 7.7 | 6.4 | 7.0 | 7.3 | 7.1 |
| | Na$_2$O | 0.21 | 0.29 | 0.25 | 0.21 | 0.28 | 0.33 | 0.21 |
| | K$_2$O | 0.58 | 0.51 | 0.63 | 0.61 | 0.65 | 0.49 | 0.85 |
| | Li$_2$O | 0.15 | 0.01 | 0.15 | 0.30 | 0.40 | 0.09 | 0.25 |
| | Fe$_2$O$_3$ | 0.41 | 0.44 | 0.41 | 0.41 | 0.41 | 0.42 | 0.41 |
| | TiO$_2$ | 0.33 | 0.33 | 0.36 | 0.37 | 0.46 | 0.47 | 0.38 |
| | ZrO$_2$ + HfO$_2$ | — | — | — | — | — | — | 0.4 |
| Ratio | C1 | 2.11 | 2.07 | 2.08 | 2.38 | 2.02 | 2.13 | 2.20 |
| | C2 | 2.77 | 1.76 | 2.52 | 2.91 | 2.33 | 1.49 | 4.05 |
| Parameter | Forming temperature/° C. | 1277 | 1274 | 1276 | 1277 | 1277 | 1277 | 1276 |
| | Liquidus temperature/° C. | 1196 | 1194 | 1193 | 1201 | 1195 | 1197 | 1196 |
| | ΔT/° C. | 81 | 80 | 83 | 76 | 82 | 80 | 80 |
| | Crystallization peak temperature/° C. | 1029 | 1035 | 1037 | 1020 | 1033 | 1026 | 1030 |
| | Filament strength/mPa | 4141 | 4129 | 4136 | 4147 | 4150 | 4140 | 4143 |
| | Amount of bubbles/pcs | 6 | 8 | 5 | 6 | 5 | 6 | 6 |

TABLE 2

| | | A8 | A9 | A10 | A11 | Traditional E glass | Traditional R glass | Improved R glass |
|---|---|---|---|---|---|---|---|---|
| Component | SiO$_2$ | 58.0 | 60.1 | 59.7 | 60.0 | 54.16 | 60 | 60.75 |
| | Al$_2$O$_3$ | 15.1 | 15.4 | 15.7 | 15.2 | 14.32 | 25 | 15.80 |
| | CaO | 15.4 | 14.9 | 15.5 | 15.4 | 22.12 | 9 | 13.90 |
| | MgO | 7.6 | 7.2 | 7.1 | 7.2 | 0.41 | 6 | 7.90 |
| | B$_2$O$_3$ | — | — | — | — | 7.6 | — | — |
| | Na$_2$O | 0.20 | 0.33 | 0.23 | 0.22 | 0.45 | trace amount | 0.73 |
| | K$_2$O | 0.56 | 0.65 | 0.59 | 0.75 | 0.25 | trace amount | |

TABLE 2-continued

|  |  | A8 | A9 | A10 | A11 | Traditional E glass | Traditional R glass | Improved R glass |
|---|---|---|---|---|---|---|---|---|
|  | $Li_2O$ | 0.30 | 0.30 | 0.19 | 0.25 | 0 | 0 | 0.48 |
|  | $Fe_2O_3$ | 0.40 | 0.43 | 0.41 | 0.43 | 0.35 | trace amount | 0.18 |
|  | $TiO_2$ | 0.34 | 0.39 | 0.38 | 0.35 | 0.34 | trace amount | 0.12 |
|  | $ZrO_2 + HfO_2$ | 2.0 | 0.1 | 0.15 | — | — | — | — |
| Ratio | C1 | 2.03 | 2.07 | 2.19 | 2.14 | 53.96 | 1.5 | 1.76 |
|  | C2 | 2.8 | 1.82 | 2.57 | 3.41 | 0.56 | — | — |
| Parameter | Forming temperature/° C. | 1277 | 1277 | 1278 | 1276 | 1175 | 1430 | 1278 |
|  | Liquidus temperature/° C. | 1196 | 1197 | 1200 | 1195 | 1075 | 1350 | 1210 |
|  | ΔT/° C. | 81 | 80 | 78 | 81 | 100 | 80 | 68 |
|  | Crystallization peak temperature/° C. | 1032 | 1030 | 1023 | 1034 | / | 1010 | 1016 |
|  | Filament strength/mPa | 4164 | 4145 | 4123 | 4149 | 3265 | 4220 | 4089 |
|  | Amount of bubbles/pcs | 10 | 5 | 6 | 4 | 3 | 30 | 25 |

It can be seen from the values in the above tables that, compared with the traditional R glass and improved R glass, the glass fiber composition of the present disclosure has the following advantages: (1) Much lower liquidus temperature, which helps to reduce crystallization risk and increases the fiber drawing efficiency. (2) Higher crystallization peak temperature, which means more energy is needed for the crystal nucleuses to form and grow during crystallization procedure, that is to say, the glass of the present disclosure has lower crystallization risk under the same conditions. (3) Much lower amount of bubbles, which means the fining performance of the molten glass of the present disclosure is better. Meanwhile, the glass fiber of the present disclosure has higher filament strength compared with the improved R glass.

The glass fiber composition according to the present disclosure can be used for making glass fibers having the aforementioned excellent properties.

The glass fiber composition according to the present disclosure can be used in combination with one or more organic and/or inorganic materials for preparing composite materials having excellent performances, such as glass fiber reinforced base materials.

In conclusion, the present disclosure provides a boron-free glass fiber composition, glass fiber and composite material therefrom. The composition can not only keep the forming temperature relatively low, but also solve the problems in the production of high-performance glass fiber, such as high liquidus temperature, high crystallization rate, high surface tension, fining difficulty, and the difficulty in efficient and large-scale production. The composition can significantly reduce liquidus temperature and surface tension of molten glass, and reduce crystallization tendency of glass and the amount of bubbles under the same conditions. Meanwhile, the glass fiber made therefrom possesses favorable mechanical strength.

Finally, what should be made clear is that, in this text, the terms "contain", "comprise" or any other variants are intended to mean "nonexclusively include" so that any process, method, article or equipment that contains a series of factors shall include not only such factors, but also include other factors that are not explicitly listed, or also include intrinsic factors of such process, method, object or equipment. Without more limitations, factors defined by the phrase "contain a . . . " or its variants do not rule out that there are other same factors in the process, method, article or equipment which include the factors.

The glass fiber composition of the present disclosure makes a breakthrough in crystallization properties, filament strength and heat resistance of the glass, as compared with the present mainstream improved R glass, and greatly reduces crystallization risk, and significantly improves the filament strength and softening point temperature under the same conditions; in addition, the cost-performance ratio of the overall technical solutions of the composition is higher, thereby making it more suitable for large-scale industrial production.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A composition of matter, comprising the following components expressed as percentage by weight:

| | |
|---|---|
| $SiO_2$ | 58-60.4%; |
| $Al_2O_3$ | 14-16.5%; |
| CaO | 14.1-16.5%; |
| MgO | 6-8.2%; |
| $Li_2O$ | 0.01-0.4%; |
| $Na_2O + K_2O$ | greater than or equal to 0.725% and less than 1.15%; |
| $K_2O$ | greater than 0.5%; |
| $TiO_2$ | less than 1.5%; and |
| $Fe_2O_3$ | less than 1%; | wherein
a range of the weight percentage ratio CaO/MgO is greater than 2 and less than or equal to 2.4, and a range of the weight percentage ratio $K_2O/Na_2O$ is greater than 1 and less than or equal to 6.

2. The composition of claim 1, wherein a content of $Li_2O$ expressed as weight percentage is greater than or equal to 0.01% and less than 0.1%.

3. The composition of claim 1, further comprising at least one of $ZrO_2$ or $HfO_2$, and a total content of $ZrO_2$ and $HfO_2$ expressed as weight percentage is 0.01-2%.

4. The composition of claim 1, further comprising a non-zero amount of $ZrO_2$ and a non-zero amount of $HfO_2$, and a total content of $ZrO_2$ and $HfO_2$ expressed as weight percentage is 0.01-2%.

5. The composition of claim 1, wherein a range of the weight percentage ratio CaO/MgO is greater than 2 and less than or equal to 2.3.

6. The composition of claim 1, wherein a range of the weight percentage ratio $K_2O/Na_2O$ is 1.2-5.

7. The composition of claim 1, comprising the following components expressed as percentage by weight:

| | |
|---|---|
| $SiO_2$ | 58.5-60.4%; |
| $Al_2O_3$ | 14.5-16.5%; |
| CaO | 14.1-16.1%; |
| MgO | 6-8%; |
| $Li_2O$ | 0.01-0.4%; |
| $Na_2O + K_2O$ | greater than or equal to 0.725% and less than 1.15%; |
| $K_2O$ | greater than 0.5%; |
| $TiO_2$ | less than 1.5%; and |
| $Fe_2O_3$ | less than 1%; | wherein
  a range of the weight percentage ratio CaO/MgO is greater than 2 and less than or equal to 2.3, and a range of the weight percentage ratio $K_2O/Na_2O$ is greater than 1 and less than or equal to 6.

8. The composition of claim 1, wherein comprising the following components expressed as percentage by weight:

| | |
|---|---|
| $SiO_2$ | 58.5-60.4%; |
| $Al_2O_3$ | 14.5-16.5%; |
| CaO | 14.1-16.1%; |
| MgO | 6-8%; |
| $Li_2O$ | 0.01-0.4%; |
| $Na_2O + K_2O$ | greater than or equal to 0.725% and less than 1.15%; |
| $K_2O$ | greater than 0.5%; |
| TiO2 | less than 1.5%; and |
| $Fe_2O_3$ | less than 1%; | wherein
  a range of the weight percentage ratio CaO/MgO is greater than 2 and less than or equal to 2.14, and a range of the weight percentage ratio $K_2O/Na_2O$ is 1.2-5.

9. The composition of claim 8, wherein a content of $Li_2O$ expressed as weight percentage is greater than or equal to 0.01% and less than 0.1%.

10. The composition of claim 8, further comprising at least one of $ZrO_2$ or $HfO_2$, and a total content of $ZrO_2$ and $HfO_2$ expressed as weight percentage is 0.01-2%.

11. A glass fiber, wherein the glass fiber is produced from the composition of claim 1.

12. The glass fiber of claim 11, wherein the composition further comprises at least one of $ZrO_2$ or $HfO_2$, and a total content of $ZrO_2$ and $HfO_2$ expressed as weight percentage is 0.01-2%.

13. The glass fiber of claim 11, wherein the composition further comprises the following components expressed as percentage by weight:

| | |
|---|---|
| $SiO_2$ | 58.5-60.4%; |
| $Al_2O_3$ | 14.5-16.5%; |
| CaO | 14.1-16.1%; |
| MgO | 6-8%; |
| $Li_2O$ | 0.01-0.4%; |
| $Na_2O + K_2O$ | greater than or equal to 0.725% and less than 1.15%; |
| $K_2O$ | greater than 0.5%; |
| $TiO_2$ | less than 1.5%; and |
| $Fe_2O_3$ | less than 1%; | wherein
  a range of the weight percentage ratio CaO/MgO is greater than 2 and less than or equal to 2.3, and a range of the weight percentage ratio $K_2O/Na_2O$ is greater than 1 and less than or equal to 6.

14. The glass fiber of claim 11, wherein the composition further comprises the following components expressed as percentage by weight:

| | |
|---|---|
| $SiO_2$ | 58.5-60.4%; |
| $Al_2O_3$ | 14.5-16.5%; |
| CaO | 14.1-16.1%; |
| MgO | 6-8%; |
| $Li_2O$ | 0.01-0.4%; |
| $Na_2O + K_2O$ | greater than or equal to 0.725% and less than 1.15%; |
| $K_2O$ | greater than 0.5%; |
| $TiO_2$ | less than 1.5%; and |
| $Fe_2O_3$ | less than 1%; | wherein
  a range of the weight percentage ratio CaO/MgO is greater than 2 and less than or equal to 2.14, and a range of the weight percentage ratio $K_2O/Na_2O$ is 1.2-5.

15. A composite material, comprising the glass fiber of claim 11.

16. The composite material of claim 15, wherein the composition of the glass fiber further comprises at least one of $ZrO_2$ or $HfO_2$, and a total content of $ZrO_2$ and $HfO_2$ expressed as weight percentage is 0.01-2%.

17. The composite material of claim 15, wherein the composition of the glass fiber comprises the following components expressed as percentage by weight:

| | |
|---|---|
| $SiO_2$ | 58.5-60.4%; |
| $Al_2O_3$ | 14.5-16.5%; |
| CaO | 14.1-16.1%; |
| MgO | 6-8%; |
| $Li_2O$ | 0.01-0.4%; |
| $Na_2O + K_2O$ | greater than or equal to 0.725% and less than 1.15%; |
| $K_2O$ | greater than 0.5%; |
| TiO2 | less than 1.5%; and |
| $Fe_2O_3$ | less than 1%; | wherein
  a range of the weight percentage ratio CaO/MgO is greater than 2 and less than or equal to 2.3, and a range of the weight percentage ratio $K_2O/Na_2O$ is greater than 1 and less than or equal to 6.

18. The composite material of claim 15, wherein the composition of the glass fiber comprises the following components expressed as percentage by weight:

| | |
|---|---|
| $SiO_2$ | 58.5-60.4%; |
| $Al_2O_3$ | 14.5-16.5%; |
| CaO | 14.1-16.1%; |
| MgO | 6-8%; |
| $Li_2O$ | 0.01-0.4%; |
| $Na_2O + K_2O$ | greater than or equal to 0.725% and less than 1.15%; |

-continued

| | |
|---|---|
| K$_2$O | greater than 0.5%; |
| TiO$_2$ | less than 1.5%; and |
| Fe$_2$O$_3$ | less than 1%; | wherein
a range of the weight percentage ratio CaO/MgO is greater than 2 and less than or equal to 2.14, and a range of the weight percentage ratio K$_2$O/Na$_2$O is 1.2-5.

* * * * *